US012150605B2

(12) United States Patent
Schluter

(10) Patent No.: US 12,150,605 B2
(45) **Date of Patent: *Nov. 26, 2024**

(54) WALL NICHE KIT AND RELATED METHODS

(71) Applicant: Schluter Systems L.P., Plattsburgh, NY (US)

(72) Inventor: Werner Schluter, Iserlohn (DE)

(73) Assignee: Schluter Systems L.P., Plattsburgh, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/175,293

(22) Filed: Feb. 27, 2023

(65) Prior Publication Data

US 2023/0200595 A1 Jun. 29, 2023

Related U.S. Application Data

(63) Continuation of application No. 16/752,308, filed on Jan. 24, 2020, now Pat. No. 11,612,275.

(30) Foreign Application Priority Data

Jul. 10, 2019 (DE) ......................... 202019103806.3

(51) Int. Cl.
*F21S 4/28* (2016.01)
*A47K 3/28* (2006.01)
(Continued)

(52) U.S. Cl.
CPC ............ *A47K 3/281* (2013.01); *E04F 19/061* (2013.01); *F21S 4/28* (2016.01); *F21V 23/001* (2013.01);
(Continued)

(58) Field of Classification Search
CPC ......... F21S 4/28; E04F 19/061; F21V 23/001; F21V 31/00; F21V 33/006; F21Y 2103/10; F21Y 2115/10
(Continued)

(56) References Cited

U.S. PATENT DOCUMENTS

| | | | |
|---|---|---|---|
| 9,085,903 | B2 | 7/2015 | Schlueter |
| 9,243,798 | B2 | 1/2016 | Schlueter |

(Continued)

FOREIGN PATENT DOCUMENTS

| | | | |
|---|---|---|---|
| CA | 3050138 A1 | 1/2020 | |
| CA | 3139345 | 6/2022 | |

(Continued)

OTHER PUBLICATIONS

"The Profile" news release featuring Schluter-KERDI-BOARD Shower Niche; Mar. 2013; 2 pages.

*Primary Examiner* — Elmito Breval
*Assistant Examiner* — Hana S Featherly
(74) *Attorney, Agent, or Firm* — Thorpe North & Western, LLP

(57) ABSTRACT

An installation kit for the production of a niche includes a recess element including a rear wall, four side walls and a projecting frame adjoining outward edges of the side walls and extending away from a niche. At least one of the side walls includes a passage opening formed therein. An insert can be insertable into the passage opening of the side wall on the niche side, the insert defining a recessed receiving space accessible on the niche side of the side wall, the insert including an opening opposing the receiving space. At least one cover can be receivable within the insert to at least partially cover the receiving space, the cover being positionable substantially flush with the side wall.

19 Claims, 18 Drawing Sheets

(51) Int. Cl.

| | |
|---|---|
| ***E04F 19/06*** | (2006.01) |
| ***F21V 23/00*** | (2015.01) |
| ***F21V 31/00*** | (2006.01) |
| ***F21V 33/00*** | (2006.01) |
| *F21Y 103/10* | (2016.01) |
| *F21Y 115/10* | (2016.01) |

(52) U.S. Cl.
CPC ............ *F21V 31/00* (2013.01); *F21V 33/006* (2013.01); *F21Y 2103/10* (2016.08); *F21Y 2115/10* (2016.08)

(58) Field of Classification Search
USPC .......................................................... 362/573
See application file for complete search history.

(56) References Cited

U.S. PATENT DOCUMENTS

| | | | | |
|---|---|---|---|---|
| 9,267,670 | B2 | 2/2016 | Schlueter | |
| 9,435,920 | B2 | 9/2016 | Schlueter | |
| 9,618,194 | B2 * | 4/2017 | Tress | F21V 23/006 |
| 10,280,633 | B2 | 5/2019 | Schlueter | |
| 10,401,010 | B2 | 9/2019 | Gallion et al. | |
| 2003/0053307 | A1 | 3/2003 | Talamo | |
| 2007/0201225 | A1 | 8/2007 | Holder | |
| 2012/0002417 | A1 | 1/2012 | Li | |
| 2012/0140391 | A1 | 6/2012 | Nickel et al. | |
| 2014/0168975 | A1 | 6/2014 | Ng et al. | |
| 2014/0313775 | A1 | 10/2014 | Myers | |
| 2015/0159838 | A1 | 6/2015 | Wu | |
| 2016/0341377 | A1 | 11/2016 | Eddins | |
| 2017/0159893 | A1 | 6/2017 | Wang | |
| 2017/0167714 | A1 | 6/2017 | Hong | |
| 2018/0080616 | A1 | 3/2018 | Elwell et al. | |

FOREIGN PATENT DOCUMENTS

| | | | |
|---|---|---|---|
| CN | 205655150 | U | 10/2016 |
| CN | 106287448 | A | 1/2017 |
| CN | 206268843 | U | 6/2017 |
| CN | 107869663 | A | 4/2018 |

* cited by examiner

WALL NICHE KIT AND RELATED METHODS

PRIORITY CLAIM

This application is a continuation of U.S. patent application Ser. No. 16/752,308, filed Jan. 24, 2020, which claimed priority of and to German Utility Model Application Serial No. 20 2019 103 806.3, filed Jul. 10, 2019, each of which is hereby incorporated herein by reference in its entirety.

The present invention relates to a kit for producing lighted niches in wet environments. The niche can be formed of walls having at least one side with a rigid outer foam, the niche defining or being a part of an installation element. The installation element can include a rectangular back wall, four side walls that project from the rear wall and a projecting frame adjoining front sides of the side walls.

Such installation kits are particularly useful to produce a wall niche, which can then be used for example as a support for tiles or similar covering materials. A major advantage of such installation kits is that the production of the niche on site takes very little time. In addition, the mounting element can be used in water-tight installations such that a wall-side surface seal can be ensured. Yet another advantage is that, due to the outer fleece coating, the built-in element can be clad directly with tiles in the thin-bed method or with suitable fillable covering materials or plaster layers.

It is an object of the present invention to further improve currently commercially available installation kits.

To achieve this object, the present invention provides a kit for producing a lighted niche in wet environments, such as shower and bath environments. The kit can include a plurality of components formed from a relatively rigid foam board provided with an outer nonwoven fabric on one side. These can define a mounting element which can include a rectangular rear wall, four side walls projecting from the rear wall and a front side adjoining front sides of the side walls. A projecting frame can extend outwardly from the side walls. At least one of the side walls can be provided with a through hole. In one aspect, an insert is insertable into a niche side of the through hole formed in the at least one side wall. This insert can define a niche-side accessible receiving space. A cover can be fittable within the receiving space in the insert and can be substantially level with or flush with an outer wall surface of the side wall. This cover can be at least partially closable so that at least one power cable can be guided through an opening provided in the insert part. This power cable can be fastened to or through the insert part and can have a connector end that is positioned in the receiving space.

At least one watertight LED light strip can be provided with a length that corresponds to the length of the side wall of the mounting element provided with the passage opening and projects from the underside downwards terminating in a connection cable. The power cable and the connecting cable are provided on each ends with corresponding connection elements, so that they can be releasably attached to each other. The positions of the connection cable and the receiving space are coordinated so that the connecting cable, during positioning of the LED light strip within the niche, is adjacent the passage opening in the side wall of the mounting element above the receiving space. The dimensions of the receiving space can be selected such that the power cable and the connecting cable, including their connection elements, can be accommodated therein in the interconnected state.

The mounting element may be provided as a preassembled component. Alternatively, it is also possible to assemble the installation kit from a selection of precut items or as a contiguous blank. The hard foam can be formed from a variety of materials, but in one example is extruded polystyrene, or XPS hard foam. The hard foam can advantageously be provided on both sides with an outer nonwoven fabric coating. Between the hard foam and the nonwoven fabric or similar coating or the nonwoven fabric coatings, further layers may be arranged, for example a stiffening layer, which can advantageously be made of a cementless stiffening material.

The waterproof LED light strip can be attached to one of the side walls or panels of the niche during installation. The strips' length can correspond approximately to the length of the side wall of the installation element provided with the passage opening. For power supply, at least one power cable can be provided that can be fed into the insert from an external source. This can be mated with a connecting cable from the underside of the LED strip downwards. The power cable and the connecting cable can be provided at each end with corresponding connector elements, so that they can be connected to one another. The connection can be provided in a watertight manner by using appropriate fittings. The supply of the power cable into the niche takes place through the opening of the insert part, which can advantageously provide a watertight passage through the opening of the side wall. The receiving space can serve to stow the part of the power cable projecting into the niche as well as the connection cable of the LED light strip. In this case, the position of the connecting cable and the receiving space are matched to one another such that the connecting cable can be positioned on the side wall of the installation element provided with the passage opening above the receiving chamber during the assembly of the LED light strip, so that the connecting cable is arranged in the receiving space.

Overall, the present invention provides a very easy-to-handle installation kit for producing a lighted wall niche.

In one example, the insert is made of plastic. It can advantageously have a support flange which surrounds the receiving space, which ensures that the insert part can indeed be inserted into the passage opening of the side wall, but cannot slip through it.

The cover is composed according to an embodiment of the present invention of a plurality of preferably connectable cover segments, which are advantageously each U-shaped. The segmented cover makes it possible to leave an opening for the passage of the connection cable in different positions, so that the position of the LED strip can be varied during mounting.

The upper side of the cover or the upper sides of the cover segments can advantageously be provided with a fleece coating in order to be able to anchor to the cover thin-bed mortar or other covering materials.

According to one embodiment of the present invention, an extruded profile can be provided which has a U-shaped cross section. The profile can include a base web provided with at least one slot, and two side webs projecting from the base web. At least one fastening web can be provided with through holes that can be arranged flush with the base web and can project outwardly from the U-shaped section. The U-shaped section is dimensioned in such a way that the LED light strip can advantageously be positively inserted into it. The fixing bar allows the extruded profile to be easily fixed to the side wall of the installation element with a thin-bed mortar, a putty covering material or an adhesive.

The extruded profile can advantageously be made of stainless steel or aluminum. These materials give the extruded profile on the one hand a visually appealing appearance. On the other hand, these materials are corrosion resistant.

Further features and advantages of the present invention will become apparent from the following description of a mounting kit according to an embodiment of the present invention with reference to the accompanying drawings.

Identical reference numbers subsequently designate similarly designed components or component areas.

Figure 1:
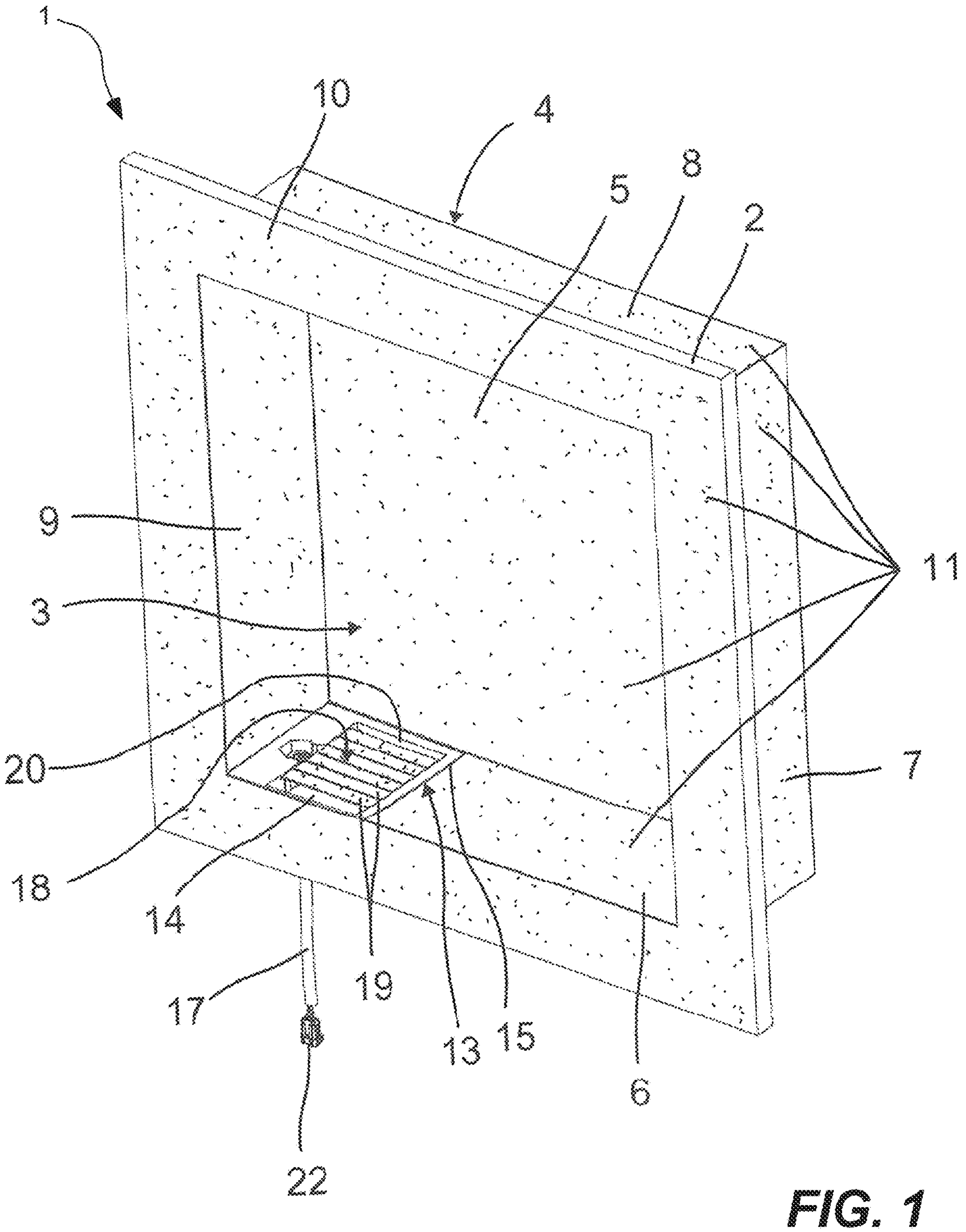
FIG. 1 is a perspective view of a mounting kit according to an embodiment of the present invention prior to mounting an extruded profile/LED strip therein.
Figure 2:
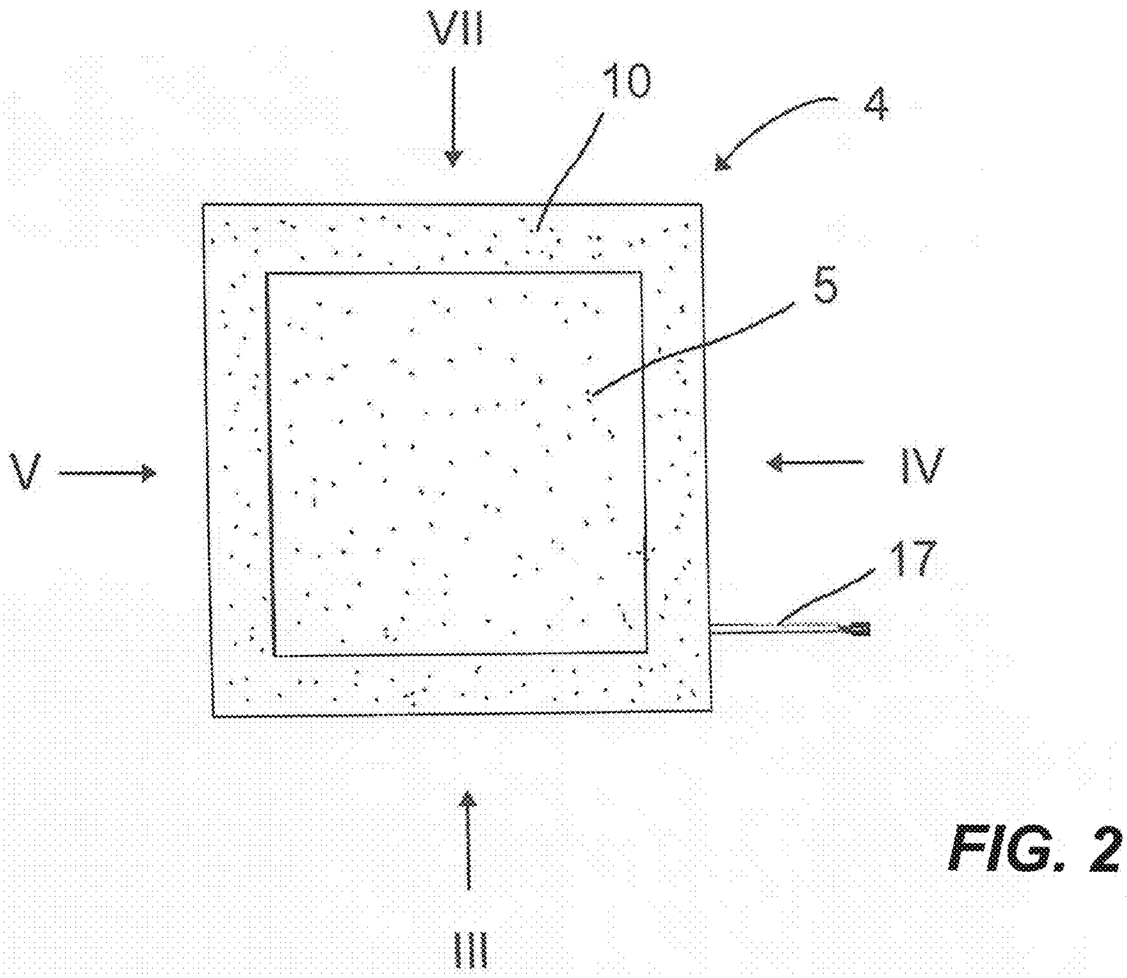
FIG. 2 is a front view of the arrangement shown in FIG. 1.
Figure 3:
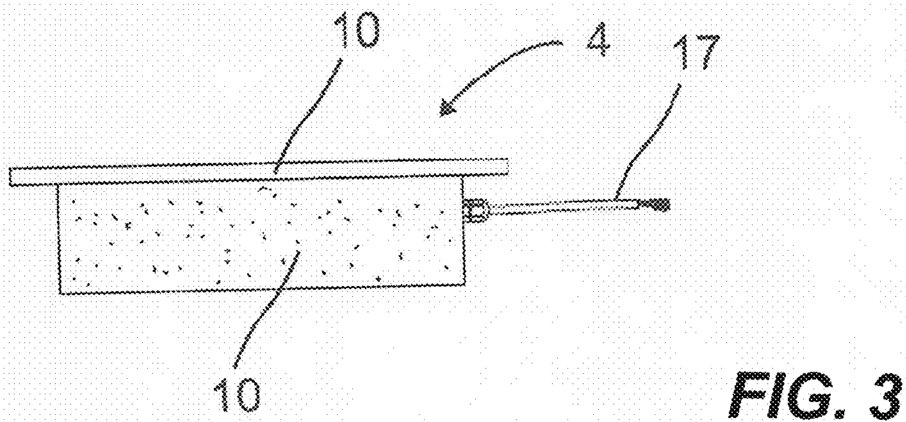
FIG. 3 is a side view of the arrangement shown in FIG. 1 in the direction of arrow III in FIG. 2.

The installation set 1 can be advantageously used to make a lighted niche, even in wet areas such as shower and bath installations. The system can include a niche 3 formed from one or more hard foam 2 panels which collectively define an installation element 4. A rectangular rear wall 5 can be abutted by four projecting side walls 6, 7, 8 and 9. A projecting frame 10 can be attached to or extend outwardly from the side walls 6, 7, 8, 9. The hard foam panels can be formed such that both sides include a stiffening layer (not shown) and an outer fleece coating 11. The stiffening layer can include a plastic layer onto which the nonwoven fabric coating 11 can be applied during production while in the not yet fully cured state. In one non-limiting example, the rear wall, side walls and projecting frame can each be formed from a material commercially available as Kerdi-Board, and each can be sealed in a water-tight fashion to the others.

Figure 4:
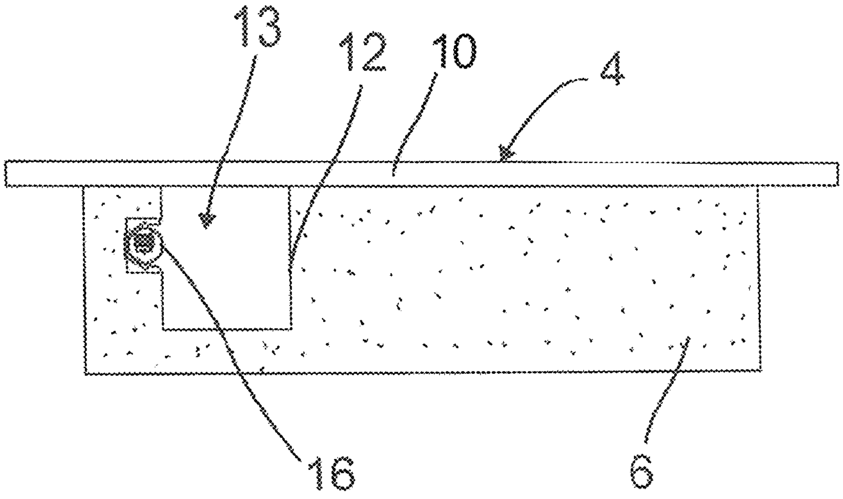
FIG. 4 is a side view of the arrangement shown in FIG. 1 in the direction of the arrow IV in FIG. 2.
Figure 5:
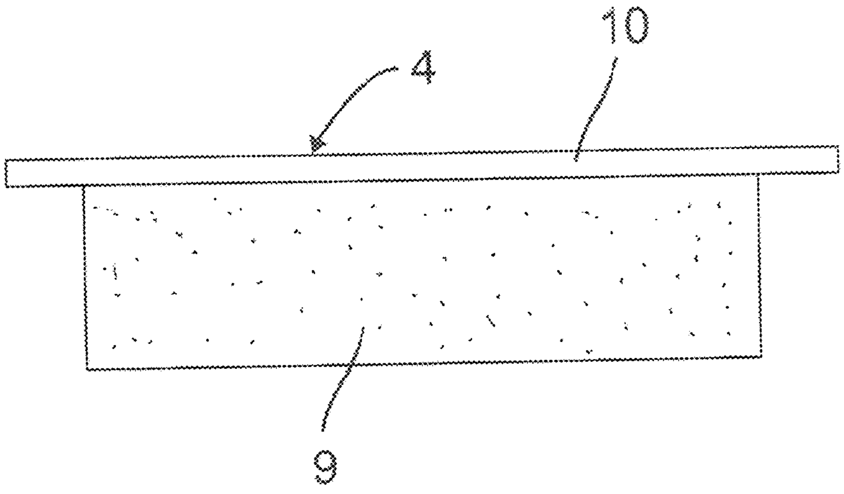
FIG. 5 is a side view of the arrangement shown in FIG. 1 in the direction of the arrow IV in FIG. 2.
Figure 6:
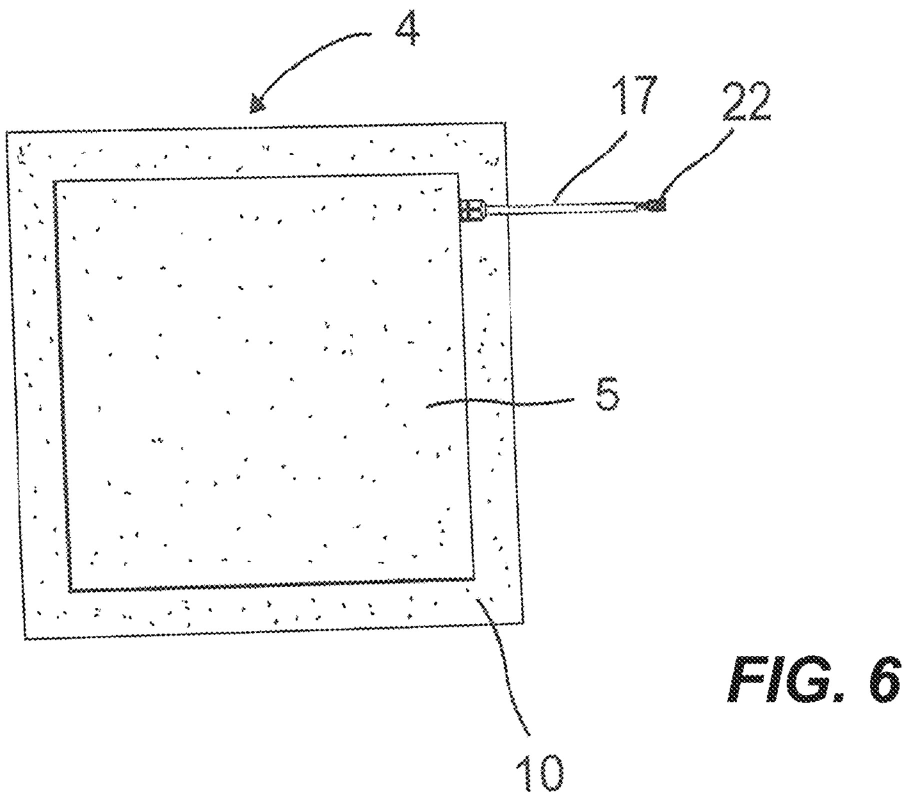
FIG. 6 is a bottom view of the arrangement shown in FIG. 1.
Figure 7:
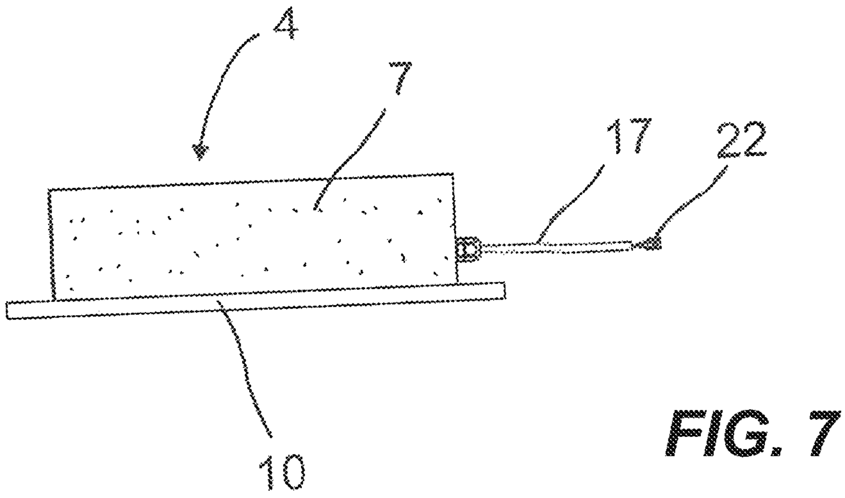
FIG. 7 is a side view of the arrangement shown in FIG. 1 in the direction of the arrow VII in FIG. 2.
Figure 8:
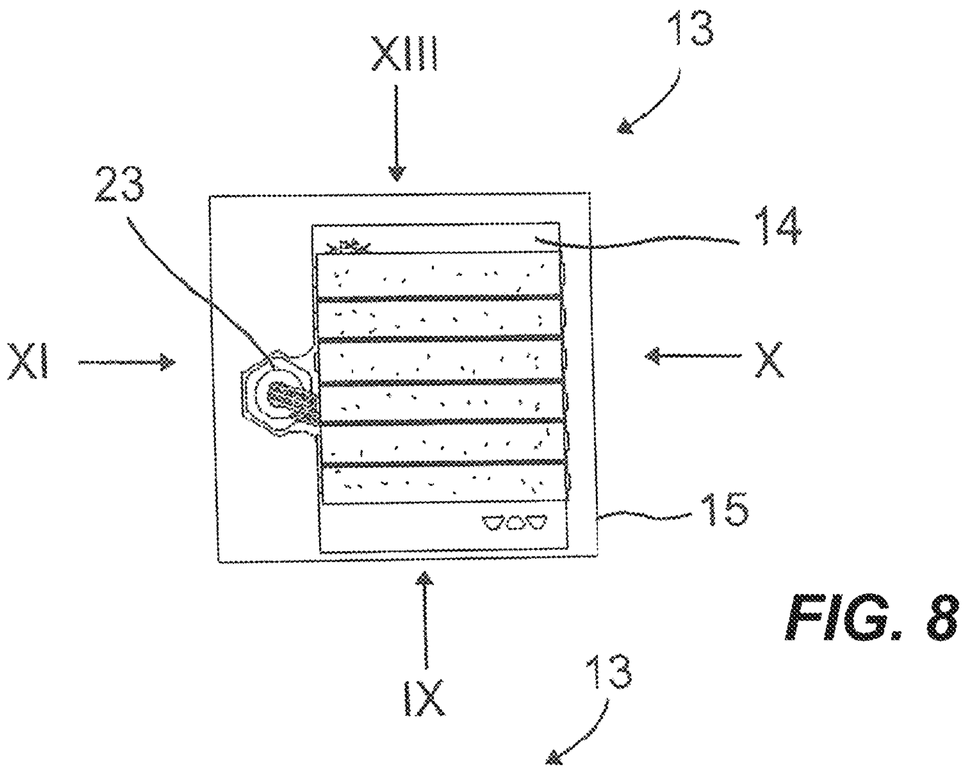
FIG. 8 is a plan view of a cover provided with the insert part of the installation kit.

The lower side wall 6 shown in FIG. 1 can be provided with a through hole 12 (see FIG. 4, for example). The through-hole can serve to allow a water-tight connection to be made within the niche to one or more components located outside of the niche. An insert part 13 can be inserted within the through-hole to define a receiving space 14 therein. The insert part 13 can be made of plastic and can include a support flange 15 that at least partially surrounds the insert part, so that it cannot slip through the through hole 12 and through the lower side wall 6.

Figure 9:
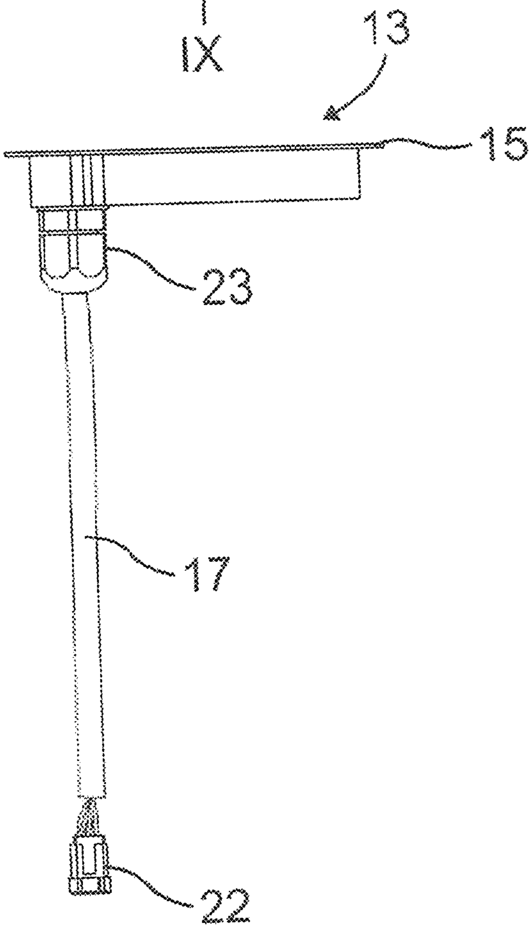
FIG. 9 is a side view of the insert in the direction of the arrow IX in FIG. 8.
Figure 10:
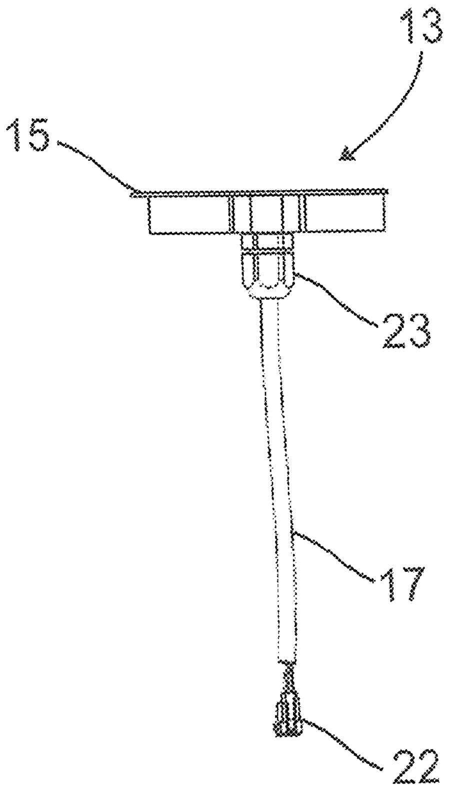
FIG. 10 is a side view in the direction of the arrow X in FIG. 8.
Figure 11:
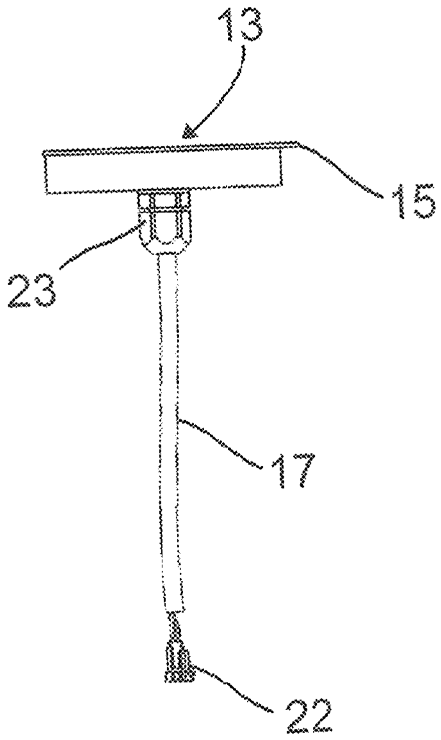
FIG. 11 is a side view of the insert in the direction of arrow XI in FIG. 8.
Figure 12:
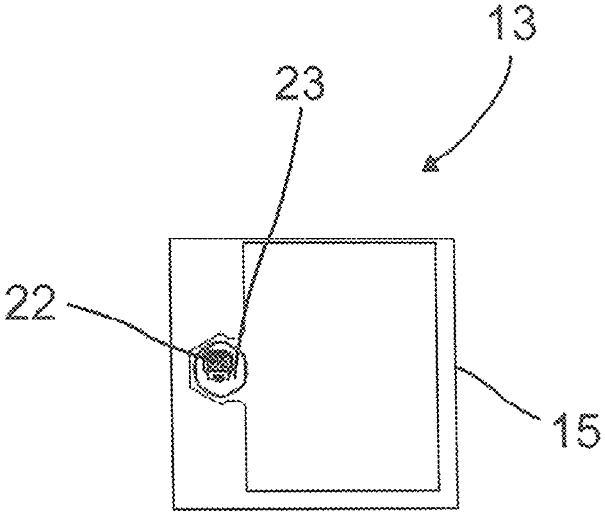
FIG. 12 is a plan view of the insert without cover.
Figure 13:
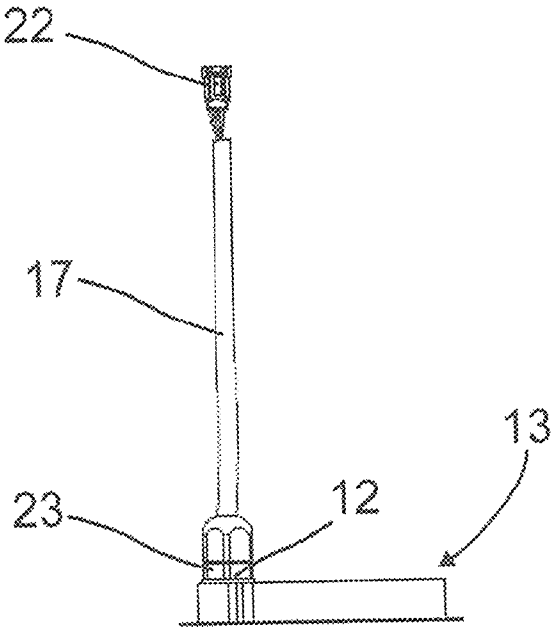
FIG. 13 is a side view of the insert in the direction of the arrow XIII in FIG. 8.

In the area of the receiving space 14, an opening or breakthrough 16 for passing a power cable 17 can be formed. A cover 18 can be provided to cover the receiving space 14 at the level of the side wall 6 is largely closed. The cover 18 can include a plurality of cover segments 19 which are each U-shaped, with the downwardly projecting legs of the respective cover segments 19 being inserted from above into the receiving space 14. The downwardly projecting legs serve as clamping legs and engage the walls of the receiving space 14 to cooperatively and mechanically fix the cover segments 19 within the receiving space. Once properly installed within the through-hole, the cover can form a relatively flat plane in relation to the flat surface of the lower side wall 6. Thus, tiles or other materials can be flatly installed over the insert and the surface of the side wall. The upper side of each cover segment 19 can be provided with a fleece coating 20. A power cable 17 can be provided at the end with connection elements 21, 22. The attachment of the power cable 17 to the insert via a conventional cable gland 23 (FIG. 9, for example), which may be waterproof. In this manner, a water-tight connection is made between the cable 17, external to the niche.

Figure 15:
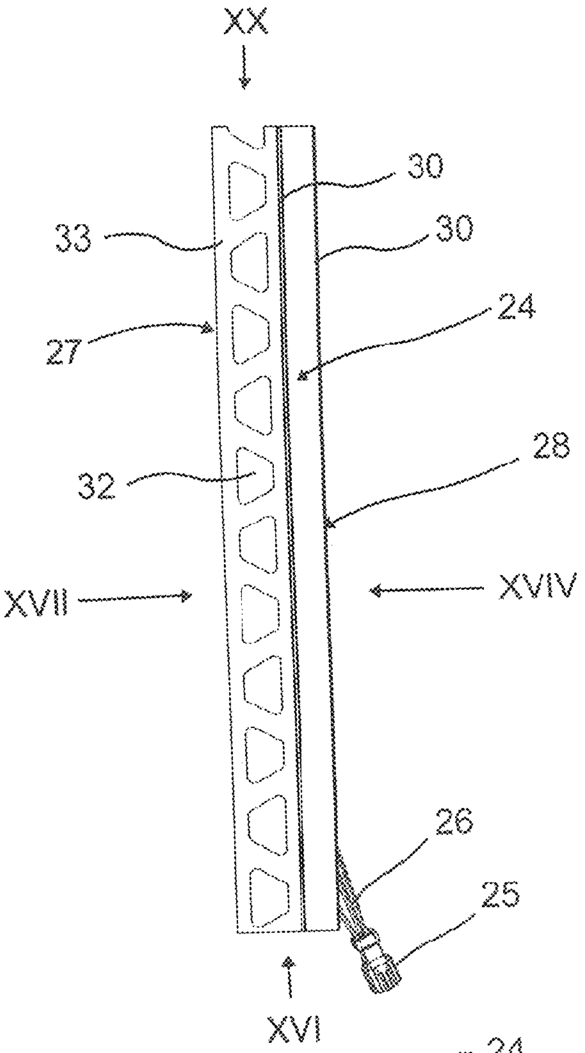
FIG. 15 is a plan view of an extruded profile of the installation set in which a waterproof LED light strip is inserted.
Figure 16:
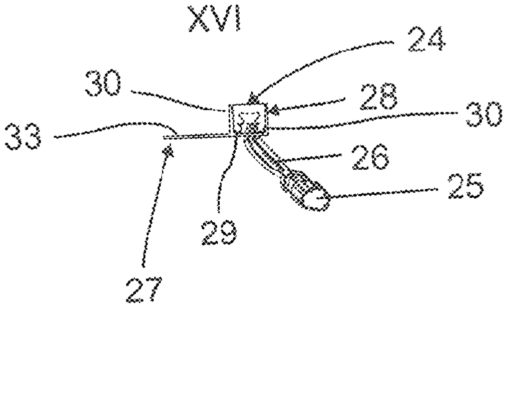
FIG. 16 is an end view in the direction of arrow XVI in FIG. 15.
Figure 17:
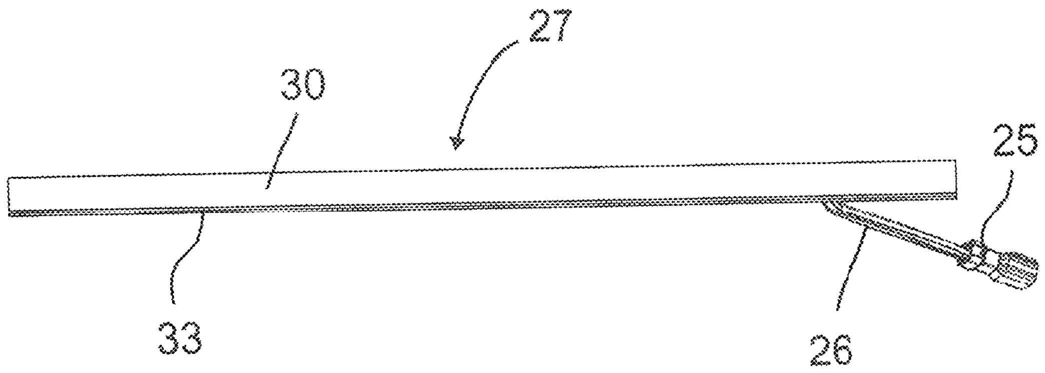
FIG. 17 is a side view in the direction of the arrow XVII in FIG. 15.
Figure 18:
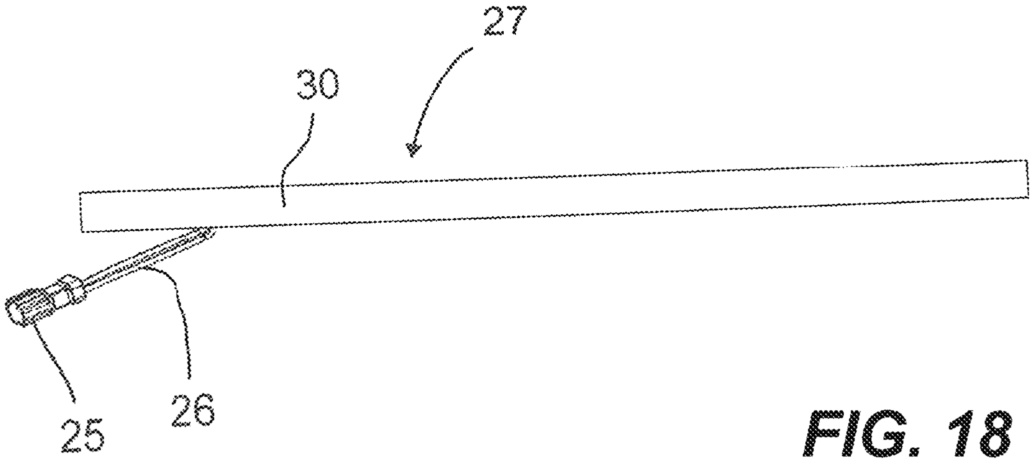
FIG. 18 is a side view in the direction of the arrow XVIII in FIG. 15.
Figure 21:
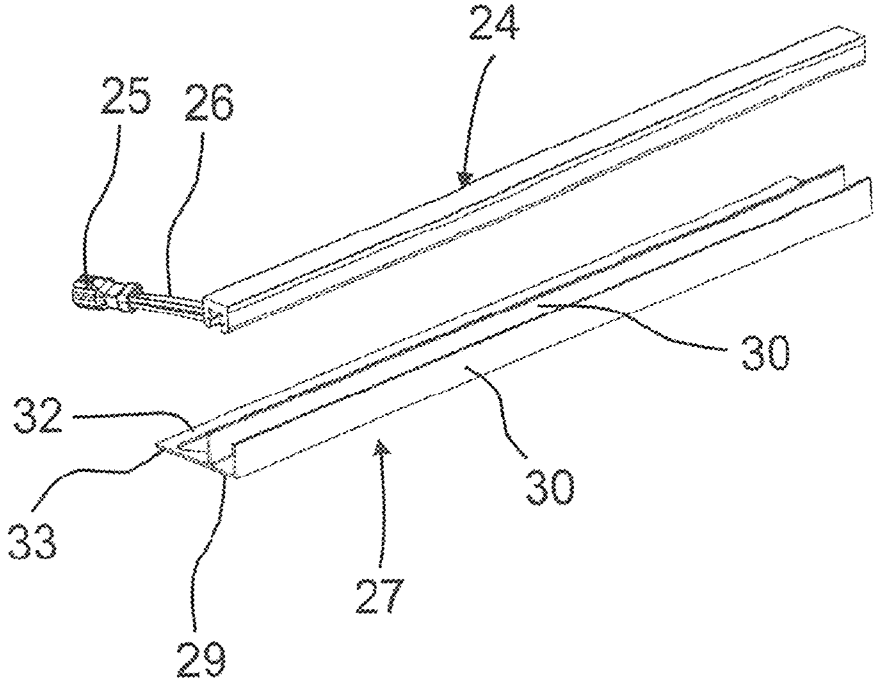
FIG. 21 is an exploded perspective view of the arrangement shown in FIG. 15.
Figure 22:
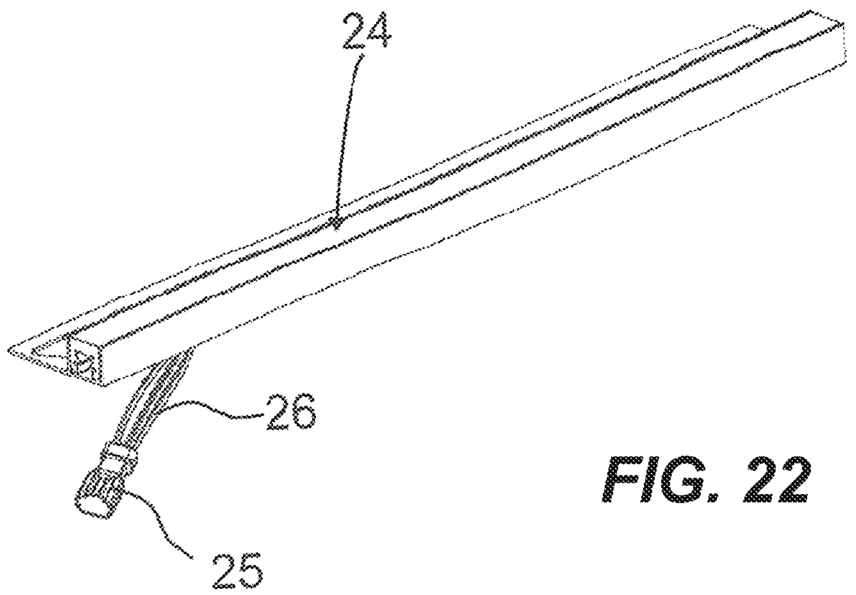
FIG. 22 is a perspective view of the arrangement shown in FIG. 20 in the mounted state.
Figure 23:
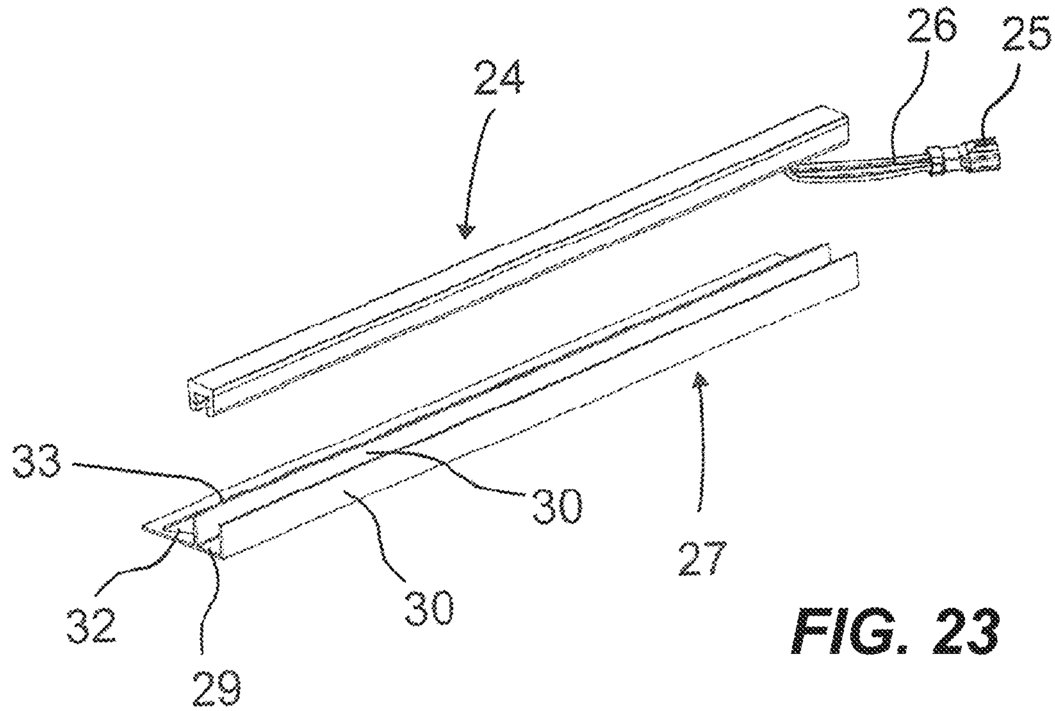
FIG. 23 is an exploded view in which the LED light strip has been rotated 180° relative to the arrangement shown in FIG. 20.
Figure 24:
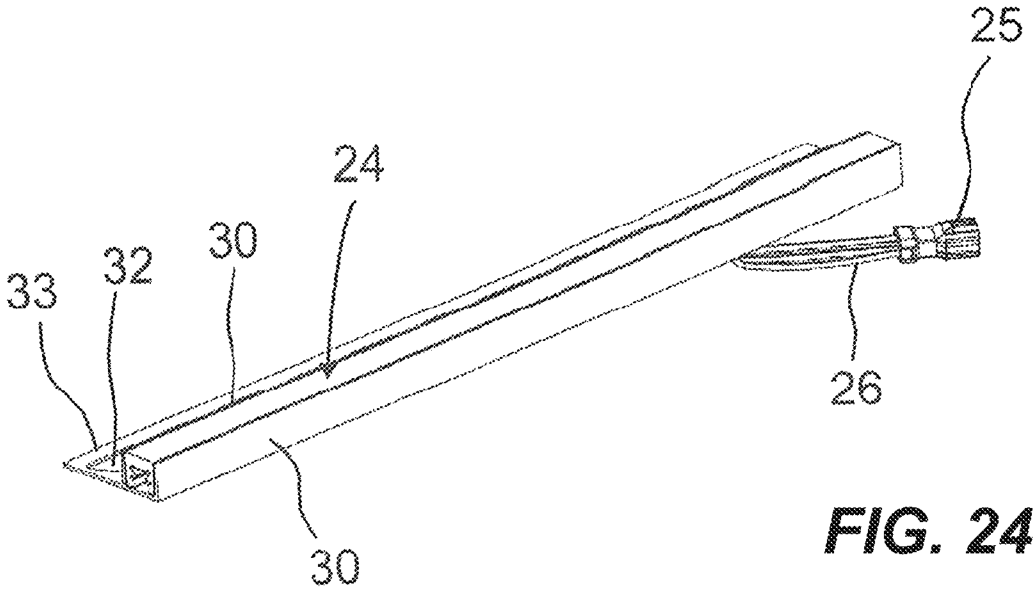
FIG. 24 is a perspective view of the arrangement shown in FIG. 22 in the mounted state.

The installation kit 1 can also include a waterproof LED light strip 24 (see FIG. 15 et. al). The light strip can have a length that corresponds to a length of an inside surface of the mounting element 4. The passage opening 12 on the side wall 6 of the mounting element 4 can provide a manner by which an electrical connection can be formed with the LED strip and a component external to the niche. The LED strip can include a connection element 25 connecting cable 26. In one example, the LED light strip can include a board provided with LEDs, which can be encapsulated, for example, with a water-tight, translucent, silicone-like plastic. The installation set 1 can include an extruded profile 27, the length of which corresponds to the length of the LED luminous strip 24. The extruded profile 27, which can be made of aluminum or stainless steel, can include a U-shaped section 28 (viewed in cross-section). The base can include a base web 29 (see FIG. 21, for example) and two end sides or webs 30 that form a positive reception location for the LED light strip 24.

Figure 19:
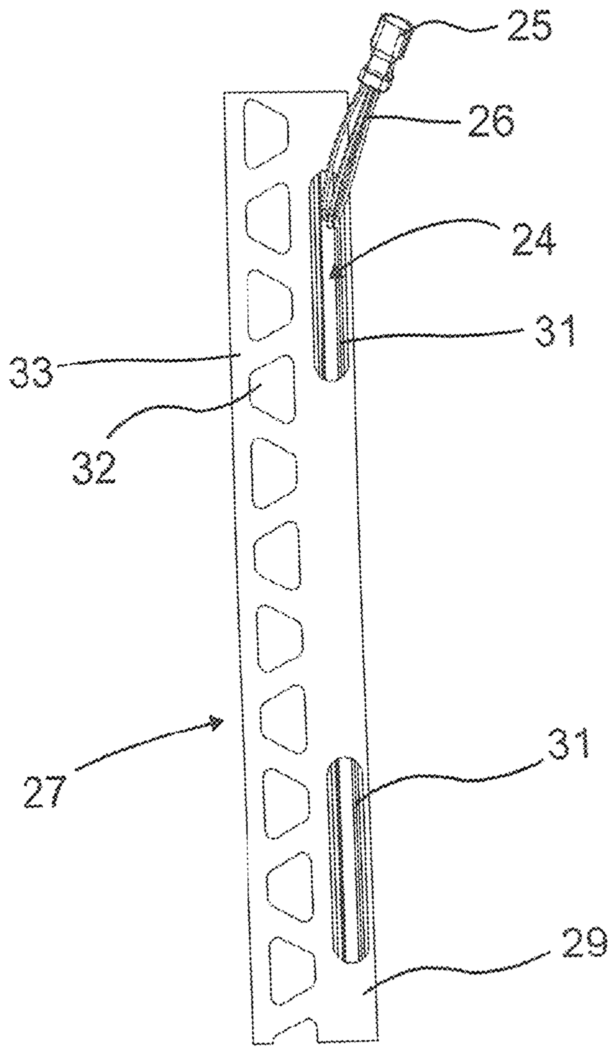
FIG. 19 is an end view of the arrangement shown in FIG. 15.
Figure 20:
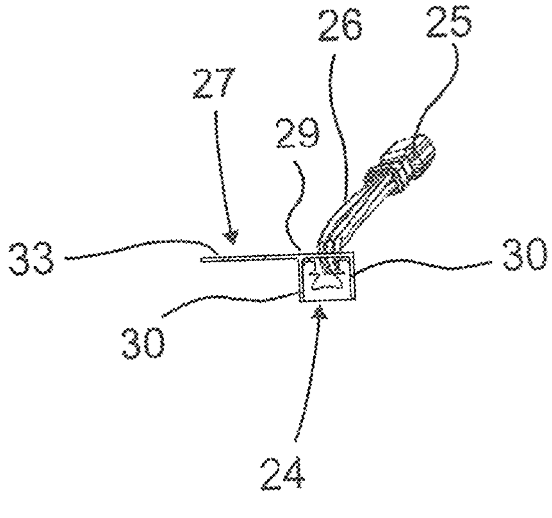
FIG. 20 is an end view in the direction of the arrow XX in FIG. 15.

The base web 29 can be provided with two elongated holes 31 (see FIG. 19, for example), the positions of which can correspond to the position of the connection cable 26 of the LED light strip 24. In this manner, the LED light strip 24 can be in two locations, offset by 180° from one another, connected through the U-shaped section 28. Furthermore, the extruded profile 27 can include a fastening web 33 provided with through holes 32. The fastening web can adjoin the base web 29 flushly and can project outwardly from the U-shaped section 28. The positions of the connection cable 26 and the receiving space 14 of the insertion part 13 can be matched to one another in such a way that the connecting cable 26 projects above the receiving space 14 when the LED light strip 24 is mounted on the side wall 6 of the installation element 4 provided with the passage opening 12. In one example, the dimensions of the receiving space 14 are selected such that the power cable 17 can be connected to the connecting cable 26 via their connection elements 21, 25 with the connection elements stored or accommodated therein.

Figure 14:
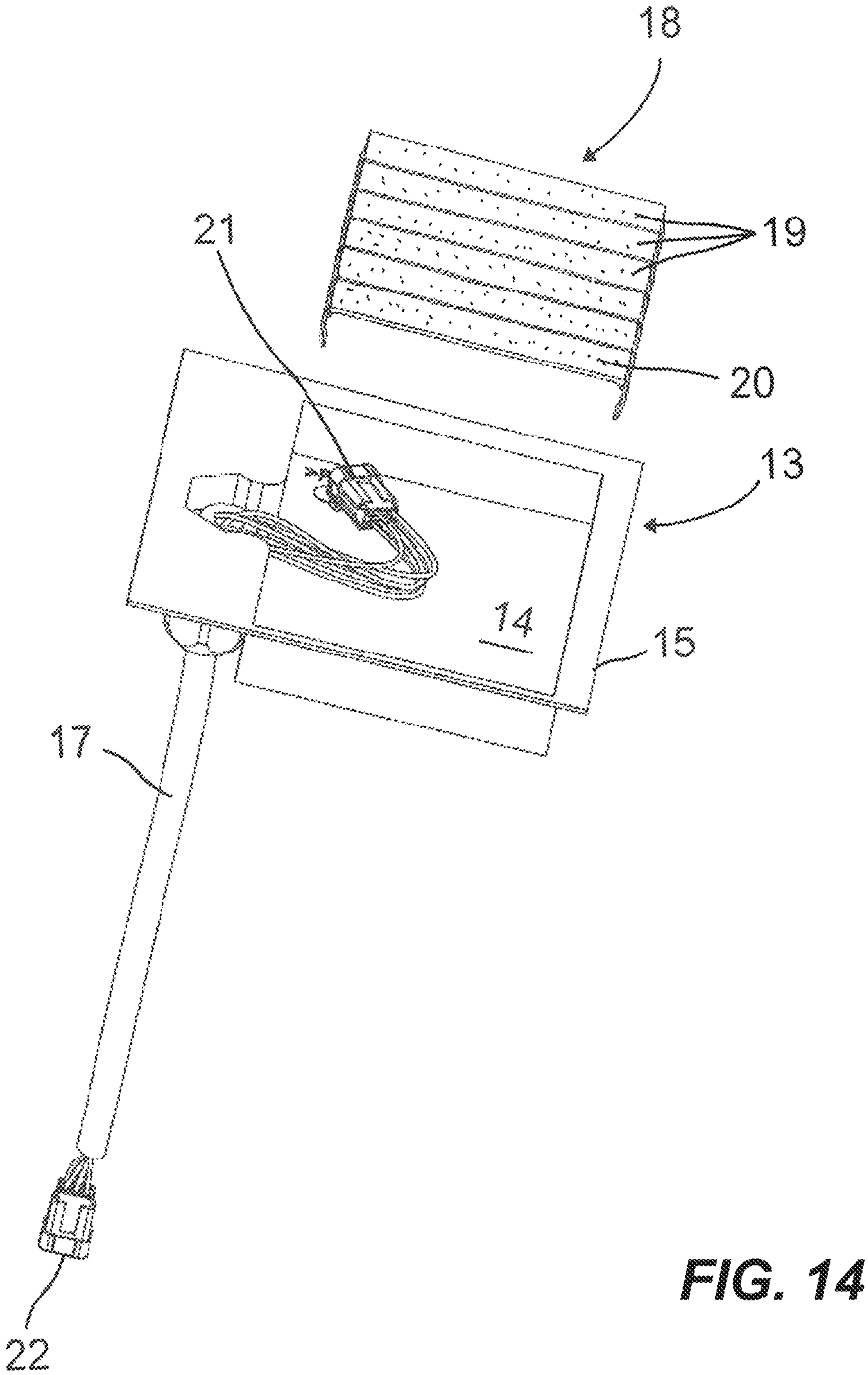
FIG. 14 is an exploded perspective view of the insert member and the cover.
Figure 25:
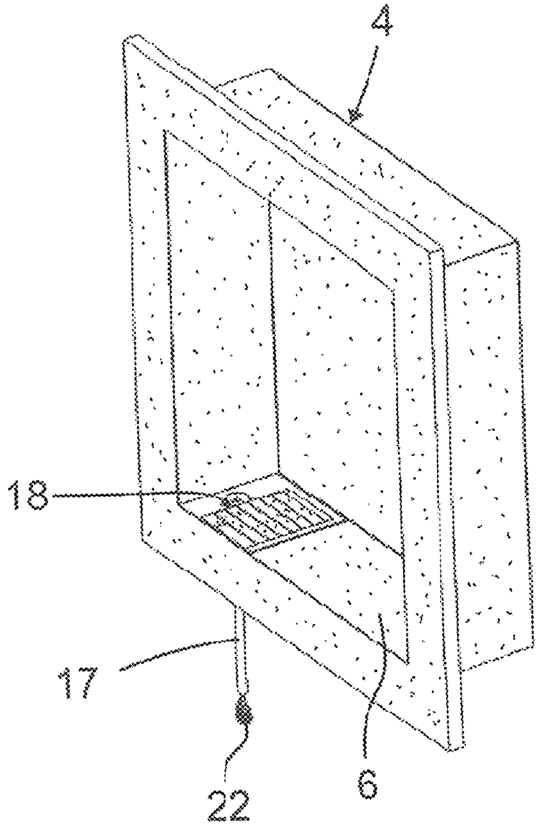
FIG. 25 is a perspective view of the installation kit without extruded profile and LED light strip.
Figure 26:
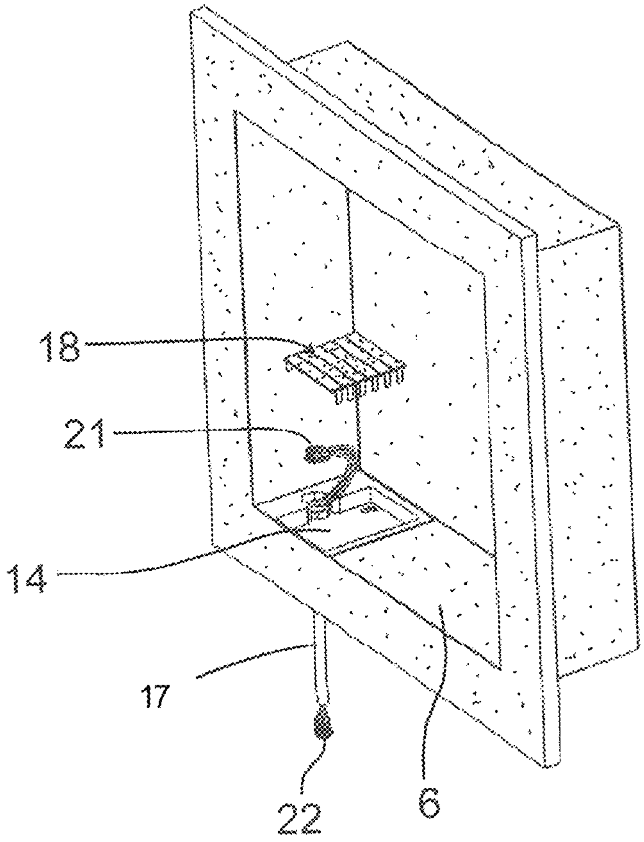
FIG. 26 is a view of the arrangement shown in FIG. 25 after lifting the cover off.
Figure 27:
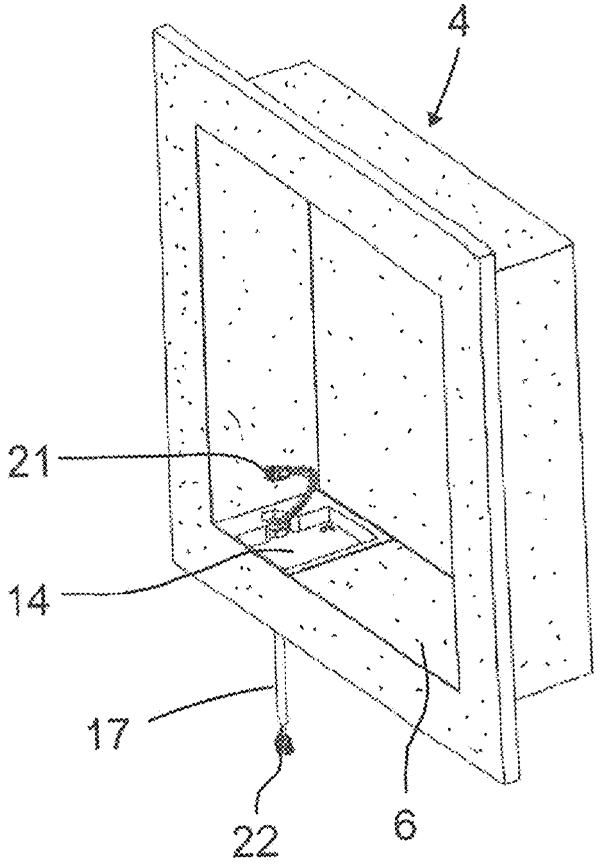
FIG. 27 is a view of the arrangement shown in FIG. 25 without cover.
Figure 28:
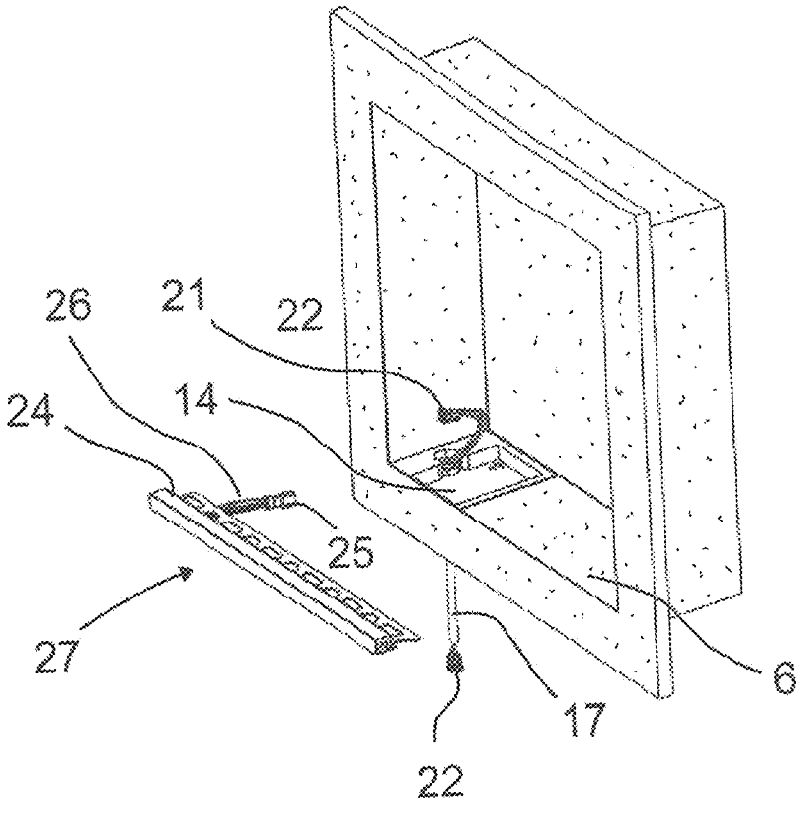
FIG. 28 shows a perspective view of the arrangement shown in FIG. 26 before connecting the LED light strip received in the extruded profile.
Figure 29:
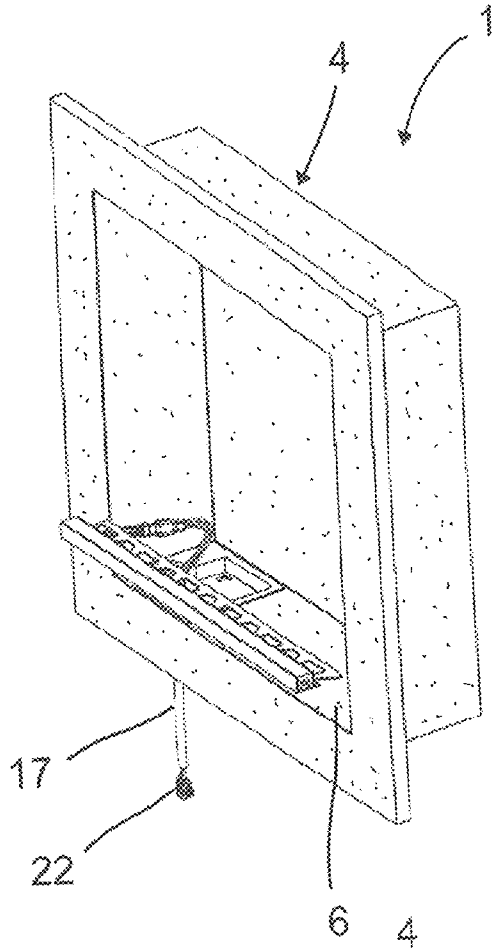
FIG. 29 is a perspective view of the arrangement shown in FIG. 27 after the connection of the LED light strip.
Figure 30:
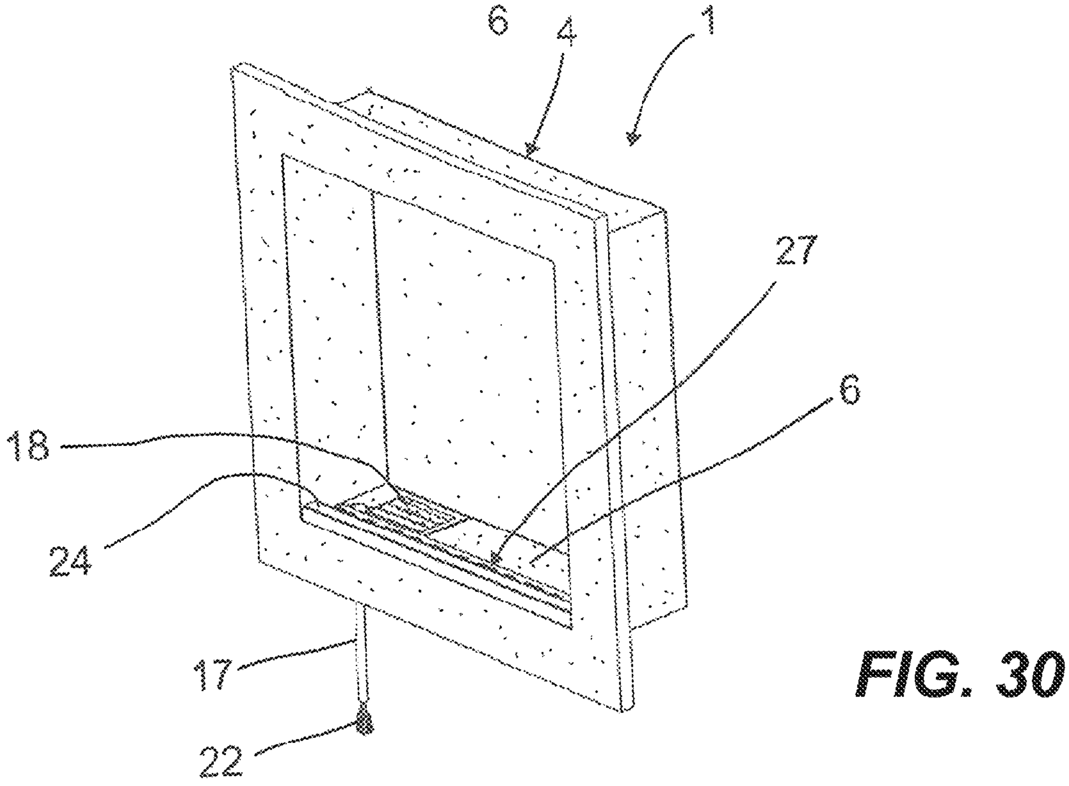
FIG. 30 is a perspective view of the assembled mounting kit with the LED light strip inserted in the extruded profile in a first position.
Figure 31:
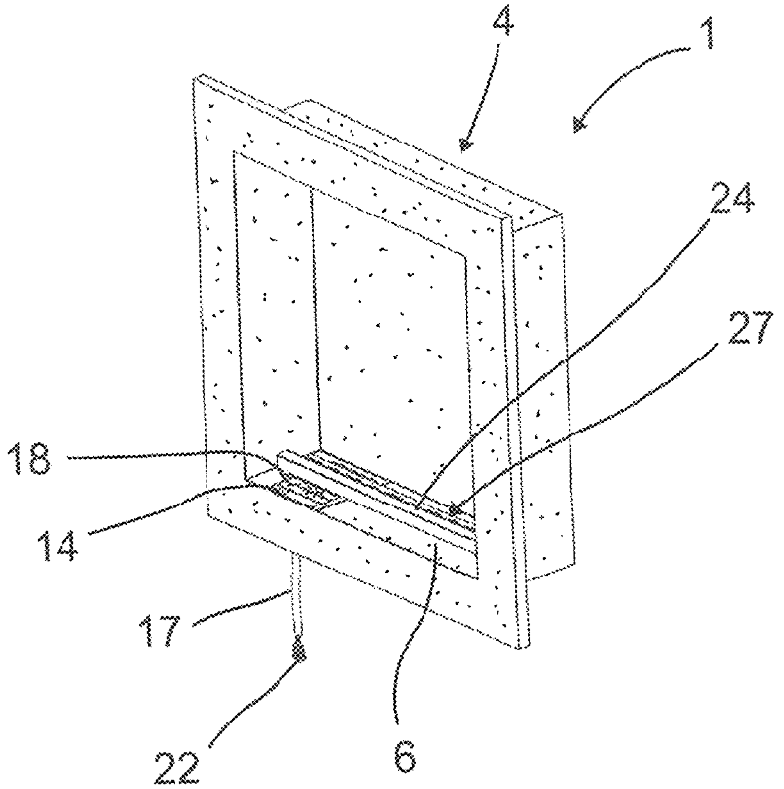
FIG. 31 is a view of the arrangement shown in FIG. 30, in which the LED light strip is in a second position.
Figure 32:
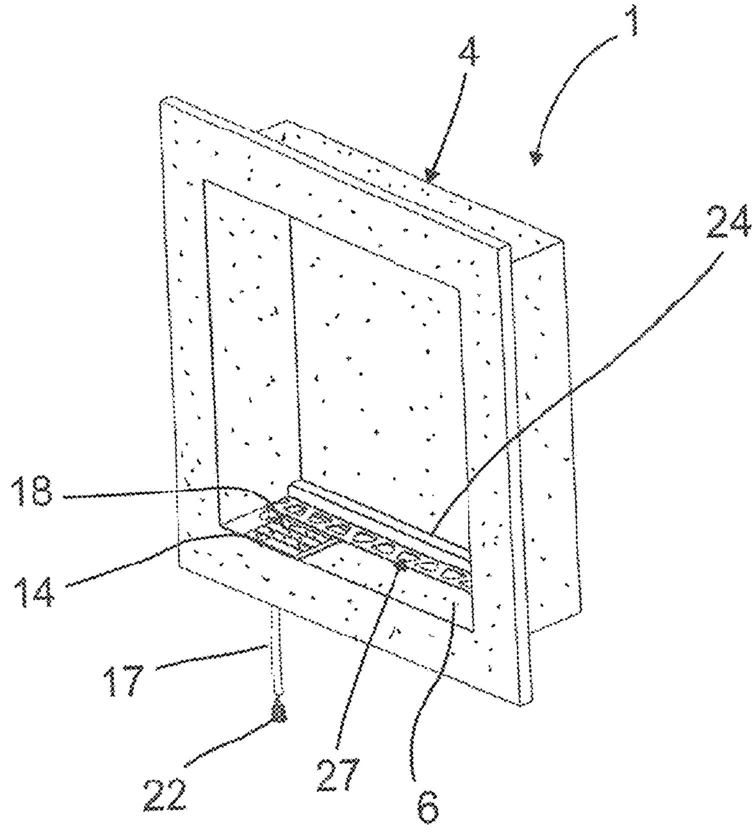
FIG. 32 is a perspective view of the arrangement shown in FIG. 29, in which the LED light strip is in a third position.

For mounting the installation kit 1, starting from the arrangement shown in FIG. 25, the cover 18 can be lifted off the insertion part 13, resulting in the arrangement shown in FIG. 14. The connecting cable 26 can extend from the extruded profile 27 LED light through one of the holes 31 and can be connected to the power cable 17. To accomplish this, the respective connection elements 21, 25 of the power cable 17 and the connecting cable 26 are formed correspondingly and advantageously for forming a watertight connection. Once the extruded profile 27 is positioned and fastened with the LED light strip 24 received therein, it can be positioned in various positions on the lower side wall 6 of the installation kit 1. Examples of these differing positions are shown in FIGS. 30 to 32. Varying the orientation of the profile can result in a differing lighting effect within the niche.

The position or connection of the individual cover segments 19 of the cover 18 can be varied in accordance with the positioning of the LED light strip 24 in the extrusion profile 27 to ensure that the cover 18 immediately below the connection cable 26 of the LED Luminous strip 24 leaves an access to the receiving space 14. Thus, for example, while only two cover segments may not completely cover the receiving space, the remaining space can be consumed by the extruded profile. This remaining space can allow the extruded profile to be positioned in a number of locations over the opening while still providing an access port for the connection cable.

Attachment of the extruded profile 27 on the lower side wall 6 of the mounting element 4 can be carried out during the tiling of the mounting element 4 with tiles or the like in the thin-bed process or with appropriate spatula-paving materials. For this purpose, both the corresponding surfaces of the installation element and the cover can be provided with nonwoven fabric coatings, in which thin-bed mortar or similar covering materials can be anchored.

Figure 33:
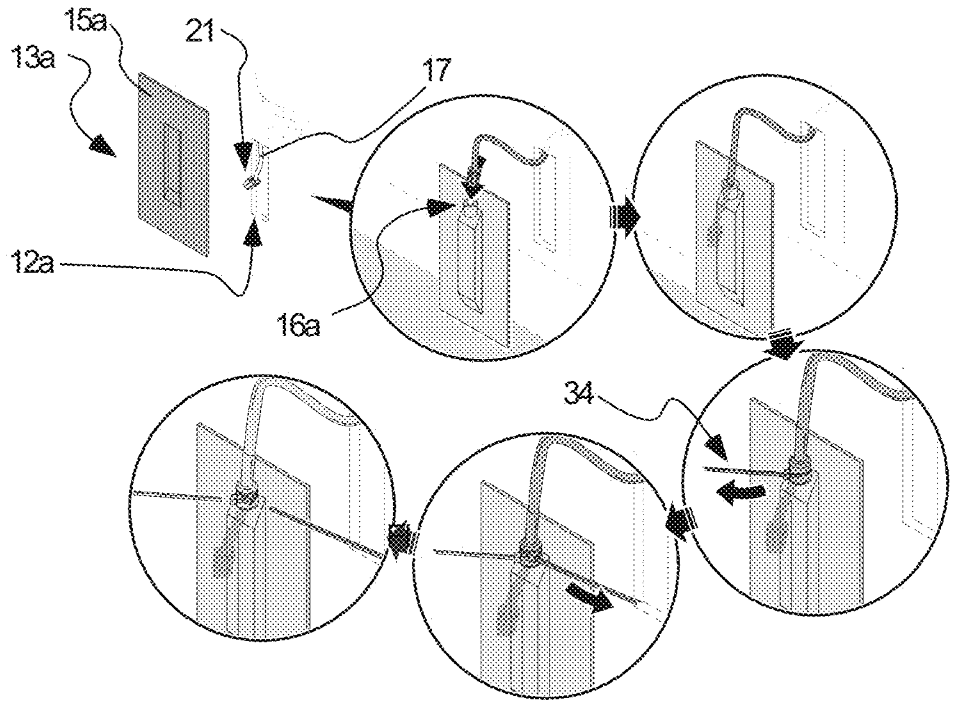
FIGS. 33 and 34 illustrate a series of views of installation of one or more components of the present technology.
Figure 34:
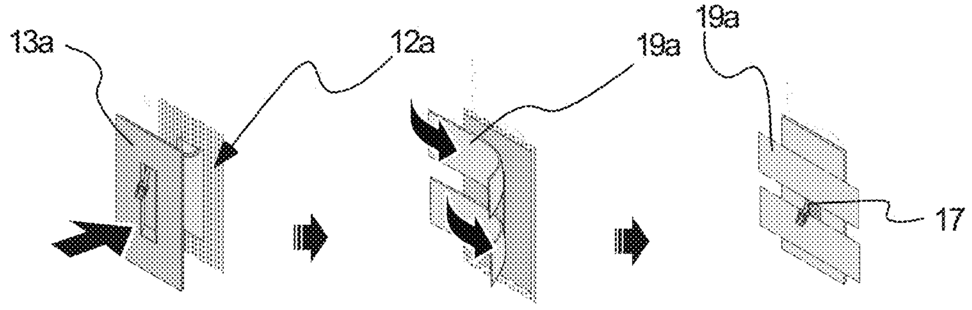

FIGS. 33 and 34 illustrate a further example of the technology in which insert or insertion part 13*a* is provided having a relatively pliable body material, such as silicone. In this embodiment, the support flange 15*a* can be formed at least partially of a fabric material, similar to the material commercially available as Kerdi. This example can advantageously be used in place of the insert 13 discussed above, or can be used in planar sections of shower walls, niche walls, etc. Opening or through hole 12*a* can be formed in a wall section, for example, with power cable 17 and terminal connector 21 accessible therethrough. As shown in the progression of FIG. 33, the power cable can be fed through opening 16*a* formed in the pliable wall. The opening can define a pliable shroud: once the power cable is positioned where desired, a securing tie 34, such as a cable tie, can be cinched about the shroud around the power cable. In this manner, a waterproof fitting can be ensured about the cable.

FIG. 34 illustrates one exemplary process by which the wall box 13*a* can be inserted within opening or through hole 12*a* formed in a planar wall surface. Once positioned where desired, cover elements 19*a* can be secured across the cavity defined by the wall box. In the example shown, the cover elements 19*a* include pliable strips that can be formed from or include the fabric material referenced above. These strips can include a "peel-and-stick" adhesive applied to rear surfaces thereof, which can be adhered over the wall box as shown in the rightmost figure of FIG. 34. Once so positioned, an LED light strip can be positioned and installed atop the wall box. A connecting cable of the light strip can be connected with the power cable 17, and the connectors can be stored beneath the cover strips. Only a very small opening will remain, which can prevent most of the thinset mortar used to fix the LED light strip and any adjacent tiles over the wall box.

In addition to using peel-and-stick adhesive on rear surfaces 19*a* of the cover strips, the strips can be secured in position using the thinset mortar used in the remaining installation.

The wall box 13*a* can advantageously be installed in open, planar areas of a wall surface, and very near corners or edges of wall or niche surfaces. As the fabric support flange 15*a* is flexible and reconfigurable, the body of the wall box can be installed in a through hole immediately adjacent to a corner or edge of a panel, and the support flange can be wrapped or folded into or around any adjoining structure. As the body is formed from a waterproof silicone or the like, a watertight installation can be achieved in a variety of locations chosen during the installation.

LIST OF REFERENCE NUMBERS

1 installation kit
2 hard foam
3 niche
4 built-in element
5 rear wall
6 sidewall
7 sidewall
8 sidewall
9 side wall
10 frames
11 fleece coating 12 through opening
13 insert
14 receiving space
15 support flange
16 breakthrough
17 power cable
18 cover
19 cover segment
20 fleece coating
21 terminal
22 terminal
23 compression fitting
24 LED light strips
25 terminal
26 connecting cable
27 extruded profile
28 U-shaped section
29 base web
30 side web
31 slot
32 through hole
33 fastening web
34 securing tie

I claim:

1. An installation kit for the production of a wet environment lighted niche, comprising:

a recess element comprising a rear wall and at least one side wall including a passage opening formed therein, the at least one side wall having an inside surface that at least partially defines a niche area and a projecting frame adjoining a front edge of the at least one side wall and projecting laterally outwardly therefrom away from the niche area;

an insert, insertable into the passage opening of the at least one side wall from the niche area, the insert defining a recessed receiving space positioned outside of and accessible from the niche area, the insert including an opening formed therethrough outside the niche area, the opening configured to receive one or more cables therethrough;

at least one cover receivable within the insert to at least partially cover the receiving space, an outside surface of the cover being positionable substantially flush with the inside surface of the at least one side wall;

at least one external power cable positionable through the opening provided in the insert;

at least one waterproof LED light strip having a length the same as or shorter than the inside surface of the at least one side wall; and a connection cable extending from the LED strip, at least a portion of which is positionable within the receiving space;

wherein the external power cable and the connection cable are each provided with corresponding connection elements enabling detachable connection.

2. The installation kit of claim 1, wherein the rear wall, the at least one side wall and the projecting frame are formed from a rigid foam material.

3. The installation kit of claim 2, wherein the rigid foam material of the rear wall, the at least one side wall and the projecting frame includes at least one waterproof side to which a covering material can be adhered.

4. The installation kit of claim 3, wherein the waterproof side of the rear wall, the at least one side wall and the projecting frame include a nonwoven fabric to which a covering material can be adhered.

5. The installation kit of claim 1, wherein the insert is made of plastic, a polymer or a synthetic rubber.

6. The installation kit of claim 1, wherein the insert includes a support flange at least partially surrounding the receiving space.

7. The installation kit of claim 1, wherein the upper side of the cover includes a waterproof coating applied thereto.

8. The installation kit of claim 1, further comprising an extruded profile having a U-shaped portion with at least one through hole formed therein, the at least one waterproof LED light strip being positionable in the U-shaped portion.

9. The installation kit of claim 8, wherein the extruded profile is made of stainless steel or aluminum.

10. A wet environment lighted niche installation, comprising:

a recess element comprising a rear wall and at least one side wall including a passage opening formed therein and having an inside surface that at least partially defines a niche area and a projecting frame adjoining a front edge of the at least one side wall and projecting laterally outwardly therefrom away from the niche area;

an insert, inserted into the passage opening of the at least one side wall from the niche area, the insert defining a recessed receiving space positioned outside of and accessible from the niche area, the insert including an opening formed therethrough outside the niche area opposite the passage opening, the opening receiving therethrough a portion of a power cable;

at least one cover positioned within the insert to at least partially cover the receiving space, an outside surface of the cover being positioned substantially flush with the inside surface of the at least one side wall;

at least one waterproof LED light strip having a length the same as or shorter than the inside surface of the at least one side wall, the LED light strip including a connection cable extending therefrom, at least a portion of which is positioned within the receiving space; and the external power cable and the connection cable each being provided with corresponding connection elements detachably connected within the insert.

11. The installation of claim 10, wherein each of the rear wall, the at least one side wall and the projecting frame are formed from a rigid foam material.

12. The installation of claim 11, wherein the rigid foam material of the rear wall, the at least one side wall and the projecting frame includes at least one waterproof side to which a covering material is adhered.

13. The installation of claim 12, wherein the waterproof side of the rear wall, the at least one side wall and the projecting frame includes a nonwoven fabric to which a covering material is adhered.

14. The installation of claim 10, further comprising an extruded profile having a U-shaped portion with at least one through hole formed therein, the at least one waterproof LED light strip being positioned in the U-shaped portion and the extruded profile being attached to the at least one side wall, the extruded profile at least partially covering the insert.

15. The installation of claim 14, wherein the extruded profile is made of stainless steel or aluminum and wherein the connection cable of the LED light strip extends through the extruded profile.

16. The installation of claim 10, further comprising a series of covering materials attached atop the walls of the recess element.

17. The installation of claim 16, wherein the covering materials comprise tiles.

18. An installation kit for the production of a wet environment lighted niche, comprising:

a recess element comprising a rear wall and four side walls having inside surfaces that define a niche area and a projecting frame adjoining front edges of the side walls and projecting outwardly therefrom away from the niche area, at least one of the side walls including a passage opening formed therein;

each of the rear wall, four side walls and projecting frame are formed from a rigid foam material having at least one waterproof side to which a covering material can be applied;

an insert, insertable into the passage opening of the side wall from the niche area, the insert defining a recessed receiving space positioned outside of and accessible from the niche area, the insert including an opening formed therethrough outside the niche area, the opening configured to receive one or more cables therethrough;

at least one cover receivable within the insert to at least partially cover the receiving space, an outside surface of the cover being positionable substantially flush with the inside surface of the side wall;

at least one external power cable positionable through the opening provided in the insert;

at least one waterproof LED light strip having a length the same as or shorter than an inside surface of one of the side walls; and a connection cable extending from the LED strip, at least a portion of which is positionable within the receiving space;

wherein the external power cable and the connection cable are each provided with corresponding connection elements enabling detachable connection.

19. The installation kit of claim 18, wherein the waterproof side of the rear wall, four side walls and projecting frame includes a nonwoven fabric to which a covering material can be adhered.

* * * * *